(12) United States Patent
Pomerant et al.

(10) Patent No.: US 9,947,039 B2
(45) Date of Patent: Apr. 17, 2018

(54) ORDER ITEM RECOGNITION SYSTEM

(71) Applicant: Oracle International Corporation, Redwood Shores, CA (US)

(72) Inventors: Mark Benjamin Pomerant, Ottawa (CA); Deepankar Dey, Mississauga (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 666 days.

(21) Appl. No.: 14/595,449

(22) Filed: Jan. 13, 2015

(65) Prior Publication Data

US 2016/0203542 A1    Jul. 14, 2016

(51) Int. Cl.
G06Q 30/06    (2012.01)
(52) U.S. Cl.
CPC ................. G06Q 30/0635 (2013.01)
(58) Field of Classification Search
CPC ................................ G06Q 30/0635
USPC ................................ 705/26.1–27.2
See application file for complete search history.

(56) References Cited

U.S. PATENT DOCUMENTS

| | | | | |
|---|---|---|---|---|
| 2010/0262581 A1* | 10/2010 | Kirkegaard | .......... | G06Q 10/063 707/624 |
| 2012/0150582 A1 | 6/2012 | Dueck | | |
| 2012/0150583 A1 | 6/2012 | Dueck et al. | | |
| 2012/0150676 A1 | 6/2012 | Dueck et al. | | |
| 2012/0150692 A1 | 6/2012 | Dueck et al. | | |
| 2012/0150693 A1 | 6/2012 | Dueck et al. | | |
| 2012/0173351 A1* | 7/2012 | Hanson | .......... | G06Q 20/204 705/17 |

OTHER PUBLICATIONS

"A systems perspective on supply chain measurements", Holmberg, Stefan. International Journal of Physical Distribution & Logistics Management, vol. 30, No. 10, pp. 847-868. (2000).*
Ahmad Naser Abdelrahman, U.S. Appl. No. 13/936,584, filed Jul. 8, 2013.
Paul Hugh Wilkie Bishop, U.S. Appl. No. 13/936,588, filed Jul. 8, 2013.
Ahmad Naser Abdelrahman, U.S. Appl. No. 13/936,567, filed Jul. 8, 2013.

(Continued)

Primary Examiner — Michael Misiaszek
Assistant Examiner — Latasha Ramphal
(74) Attorney, Agent, or Firm — Potomac Law Group, PLLC

(57) ABSTRACT

A system is provided that that recognizes an order item. The system defines an order item specification including a recognition property and a dynamic parameter property. The system further receives an order item of an order, the order item including a key that uniquely identifies a conceptual model entity and arbitrary parameters, each arbitrary parameter comprising a parameter name and a parameter value. The system further extracts the key from the order item. The system further stores the key within the recognition property. The system further identifies the conceptual model entity based on the recognition property. The system further dynamically binds parameter values from the arbitrary parameters to the dynamic parameter property based on the identified conceptual model entity.

21 Claims, 16 Drawing Sheets

(56) References Cited

OTHER PUBLICATIONS

Ben Eng, U.S. Appl. No. 13/936,682, filed Jul. 8, 2013.
Ahmad Naser Abdelrahman, U.S. Appl. No. 13/936,596, filed Jul. 8, 2013.
Paul Hugh Wilkie Bishop, U.S. Appl. No. 13/936,686, filed Jul. 8, 2013.
Ahmad Naser Abdelrahman, U.S. Appl. No. 13/936,607, filed Jul. 8, 2013.
Glenn Dexter Swanson, U.S. Appl. No. 13/936,660, filed Jul. 8, 2013.
Deepankar Dey, U.S. Appl. No. 13/936,667, filed Jul. 8, 2013.
Ahmad Naser Abdelrahman, U.S. Appl. No. 13/936,674, filed Jul. 8, 2013.
Oracle, "Oracle Communications Order and Service Mangement", Concepts, Release 7.2.2, E35415-02, Mar. 2013.

* cited by examiner

Fig. 7

```
<ord:UpdateOrder>
  <ord:OrderId>123</ord:OrderId>
  <ord:View>OsmCentralOMExampleQueryTask</ord:View>
  <ord:DataChange>
    <ord:Update
Path="/ControlData/OrderItem[@index='11'2223.3']{@type={http://oracle.communications.ordermanagement.u
nsupported.centralom}CustomerOrderItemSpecificationType}/dynamicParams[@index='2223344'][@type=
'{OracleComms_Model_BroadbandInternet/4.0.0.0}BroadbandInternet/4.0.0.0)Broadband_Bandwidth_PSType']/UploadSpeed">100
0</ord:Update>
  </ord:DataChange>
</ord:UpdateOrder>
```

ORDER ITEM RECOGNITION SYSTEM

FIELD

One embodiment is directed to a computer system, and more particularly, to a computer system that provisions services, such as communications services.

BACKGROUND

Certain computer systems are used in a number of industries, such as the communications industry, for order entry and order fulfillment. Order entry is the process of electronically receiving orders and entering the orders into the computer system, where the orders are stored as one or more entities within the computer system, so that the orders can be electronically fulfilled. Orders can contain data regarding one or more products, the pricing of one or more products, and one or more offers related to the one or more products. Orders can be received from any type of customer, such as businesses and individual consumers. Order fulfillment is the process of electronically fulfilling the orders, once the orders have been entered into the computer system. Order fulfillment generally entails one or more of the following steps: validating the order, interfacing the order to a billing system or subsystem, shipping physical goods, scheduling installation of equipment, installing equipment, and activating services. Order fulfillment can also entail other steps not listed that are part of a process of electronically fulfilling an order.

A computer system can receive orders that are in a structured format or a generic format. If the orders are in a generic format, the orders can include parameters that are merely name-value pairs, or some other loosely-typed format. However, the products (e.g., services or resources) that are associated with the order can be defined using a structured (i.e., strongly-typed format). Currently, there is no straight-forward mechanism to transform the name-value pairs or other formats to a structured format, without overcrowding an order template with all the product parameters.

SUMMARY

One embodiment is a system that recognizes an order item. The system defines an order item specification including a recognition property and a dynamic parameter property. The system further receives an order item of an order, the order item including a key that uniquely identifies a conceptual model entity and arbitrary parameters, where an arbitrary parameter can be a structured parameter or an unstructured parameter, and where an arbitrary parameter can include a parameter name and a parameter value. The system further extracts the key from the order item. The system further stores the key within the recognition property. The system further identifies the conceptual model entity based on the recognition property. The system further dynamically binds parameter values from the arbitrary parameters to the dynamic parameter property based on the identified conceptual model entity.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 7 illustrates an example of order data for an order, according to an embodiment of the invention.

FIG. 8 illustrates an example of updating order data for an order, according to an embodiment of the invention.

DETAILED DESCRIPTION

Figure 1:
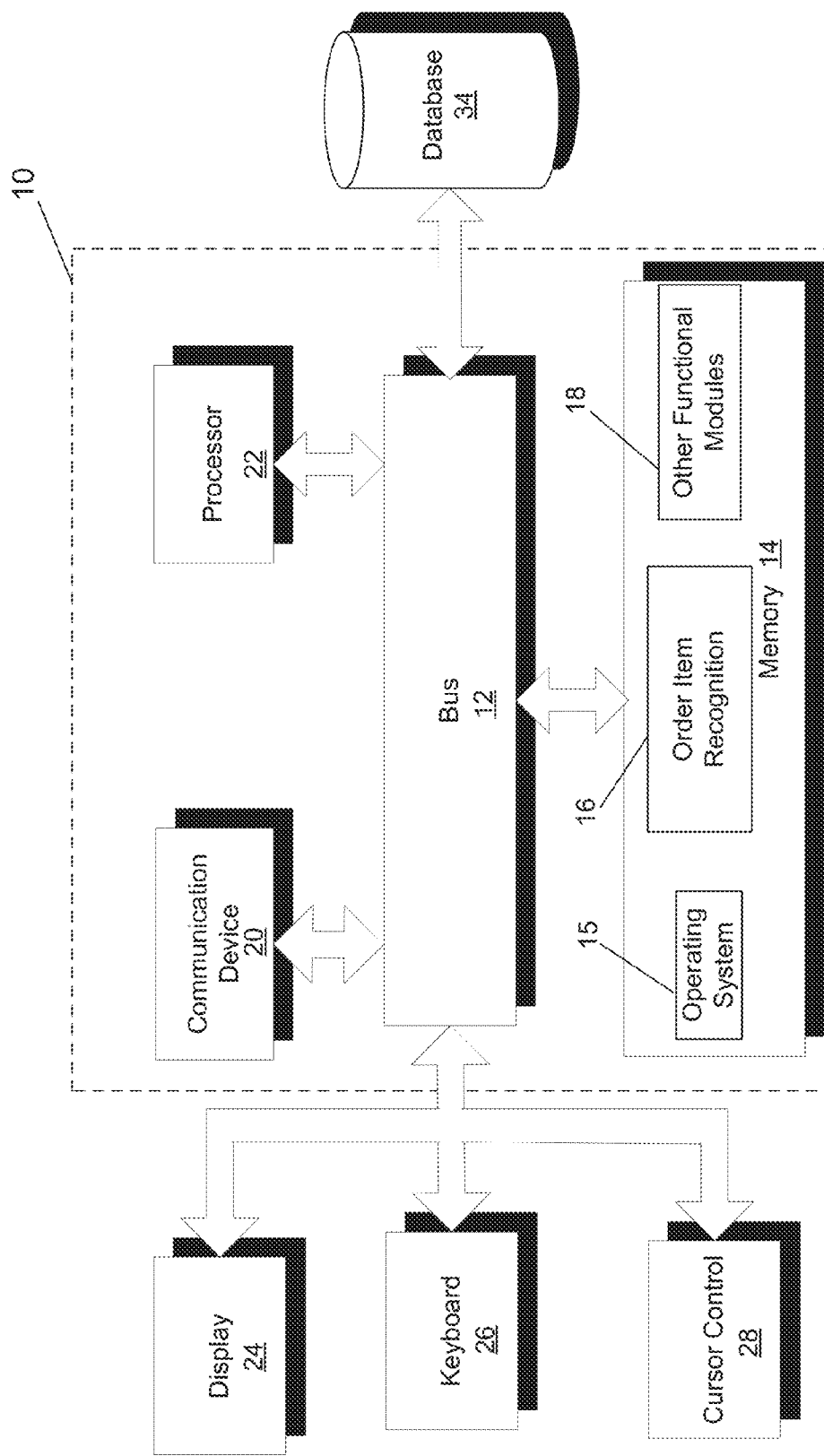
FIG. 1 illustrates a block diagram of a system that can implement an embodiment of the invention.

According to the embodiment, an order fulfillment system can recognize an order item, such as an order line, of an incoming order, recognize a product that is defined within the order item via a key and arbitrary parameters, such structured parameters or unstructured parameters, contained within the order item, and can transform the arbitrary parameters to a structured format, such as a dynamic data structure, as defined in a "conceptual model." A "conceptual model" is a data store that can be part of an order fulfillment system, and that can store metadata that is utilized by the order fulfillment system, where the metadata can define entities, such as product specifications. Thus, the order fulfillment system can map arbitrary parameters contained within an order item of an incoming order to structured parameters of a dynamic data structure associated with a conceptual model entity, and can dynamically bind the values of the arbitrary parameters to the structured parameters of the dynamic data structure associated with the conceptual model entity when processing the order at runtime.

In certain embodiments, an order can be composed of an order header and one or more order items, such as order lines. An "order header" is a component of an order that can capture information applicable to all order lines, such as an order number and customer type. An "order item" can represent an action and a subject that together represents a portion of the order intent. An action represents a request, such as "ADD," "DELETE," or "UPDATE" to apply to a subject. A subject refers to an entity that undergoes the action. An example of a subject is a product.

Further, in certain embodiments, an order fulfillment system can be configured to design and generate a fulfillment solution, where the fulfillment solution includes a plurality of provider functions, and where the fulfillment solution can fulfill an order. Order fulfillment is further described in U.S. Patent Application Publication No. 2012/0150676 (herein incorporated by reference), U.S. Patent Application Publication No. 2012/0150583 (herein incorporated by reference), U.S. Patent Application Publication No. 2012/0150692 (herein incorporated by reference), U.S. Patent Application Publication No. 2012/0150582 (herein incorporated by reference), and U.S. Patent Application Publication No. 2012/0150693 (herein incorporated by reference).

Even further, the order fulfillment system can be configured to provide a "conceptual model," where the conceptual model is a data store that can be part of an order fulfillment system, and that can store metadata that is utilized by the order fulfillment system. More specifically, the order fulfillment system can be configured to capture and store aspects of a business relevant to service fulfillment via metadata, where the metadata is defined and structured within the conceptual model. In certain embodiments, the conceptual model can be defined by defining one or more entity model items including metadata that defines one of: an entity, or one or more attributes (i.e., parameters) of an entity. In some of these embodiments, defining one or more entity model items can include defining an entity including metadata that defines a capability that is provided. Even further, in some of these embodiments, an entity can be a product specification, a customer-facing service specification, a resource-facing service specification, or a resource specification. A product specification can include metadata that defines a product that is provided. A customer-facing service specification can include metadata that defines a customer-facing service that is provided. A resource-facing service specification can include metadata that defines a resource-facing service that is provided. A resource specification can include metadata that defines a resource that is provided. A conceptual model can also be identified as a "technical catalog." A conceptual model is further described in U.S. Patent Application Publication No. 2014/0012709 (herein incorporated by reference).

An order that is received by an order fulfillment system can have an arbitrary order format. Thus, the order fulfillment system can select relevant portions of data for an order item, such as an order line, and create properties for the order line, such as an order line identifier and an order line name. Each order line can include the same properties, but each order line can also include specific order data that may be relevant to the order fulfillment system. For example, a broadband service order can include an order line with parameters, such as broadband speed parameters (e.g., "DownloadSpeed" and "UploadSpeed"). Typically, this order data is represented as loosely-typed parameters, or otherwise unstructured parameters (e.g., a parameter name "DownloadSpeed" paired with a parameter value "50 Mbps"). However, the order data can alternately be represented as strongly-typed parameter, or otherwise structured parameters.

The use of unstructured parameters, or the use of structured parameters where the structured format of the parameters is different from a structured format utilized by an order fulfillment system, can make it difficult for the order fulfillment system to identify which parameters are included within an order item, such as an order line. The order fulfillment system may be required to execute specific queries on the order data that look for a specific key and value. An order item typically contains a significant amount of order data, which can result in the specific queries taking a large amount of time. This can represent a problem when an order fulfillment system is required to perform a transformation on an order item based on the parameters included within the order item.

One option is to create an order item specification that represents an order item, where the order item specifically includes all possible parameters for all possible order items. However, this results in a very unwieldy order item specification which can include a large amount of parameters that go unused. Further, this approach goes against the general principles of an order item specification, as the properties of the order item specification expose a homogenous representation of the order line.

Thus, in one embodiment, an order fulfillment system can recognize an order item, such as an order item, identify one or more strongly-typed parameters, or otherwise structured parameters, that are associated with the order item, and generate a strongly-typed dynamic data structure, or otherwise structured dynamic data structure, that includes the structured parameters. This is identified as "order item recognition." The order fulfillment system can subsequently extract the relevant parameter values from the order item, bind the extracted parameter values within the dynamic data structure, and store the dynamic data structure within an order item specification. This is identified as "order item parameter binding." The order fulfillment system can then perform significant order processing and transformation. Order item recognition and order item parameter binding are further described below in greater detail.

FIG. 1 illustrates a block diagram of a system 10 that can implement one embodiment of the invention. In one embodiment, system 10 can be an order fulfillment system. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, an order item recognition module 16, as well as other functional modules 18. Operating system 15 can provide an operating system functionality for system 10. Order item recognition module 16 can provide functionality for recognizing an item of an order, as further disclosed below. In certain embodiments, order item recognition module 16 can comprise a plurality of modules, where each module provides specific individual functionality for recognizing an item of an order. System 10 can also be part of a larger system. Thus, system 10 can include one or more additional functional modules 18 to include the additional functionality. For example, functional modules 18 may include modules that provide additional functionality, such as functionality of an "Oracle Communications Order and Service Management" product by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

As previously described, according to an embodiment, an order fulfillment system can use order items to process order lines from an order, such as a customer order, where an order item can include an action and a subject that together represents a portion of the order intent. For each type of order that the order fulfillment system can receive from an order capture system, the order fulfillment system can configure an "order item specification" to identify one or more properties of an order item that help determine how to fulfill the order item. An "order item specification" is a data structure that includes one or more properties of the order item, where a property can include a data value contained within the order item. An order item specification can be based on an "order template," where an "order template" is a template for an order item specification, and where an order template can include one or more modeled properties. The order fulfillment system can generate one or more order item specifications based on the order template and one or more order items of a received order. In one embodiment, a data dictionary can be provided that contains a predefined data schema that defines a data structure and data elements for an order template.

Figure 2:
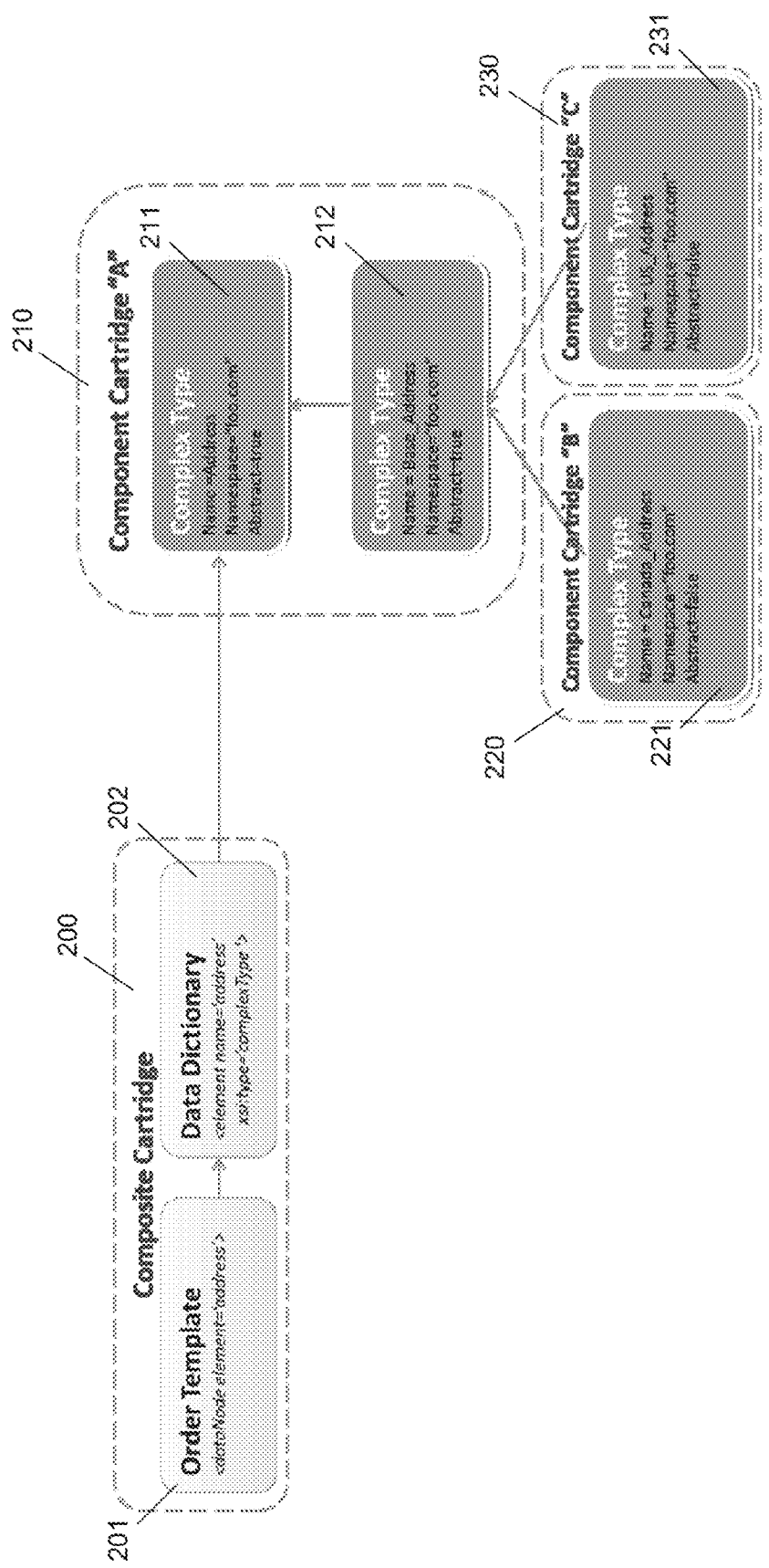
FIG. 2 illustrates a dynamic data structure, according to an embodiment of the invention.

FIG. 2 illustrates a dynamic data structure, according to an embodiment of the invention. A "dynamic data structure" is a data structure that allows heterogeneous data definitions (i.e., implementations) for a node in an order template. Each data instance can be bound to a different concrete implementation. Thus, heterogeneous data definitions can be allowed for an order item property across order items. Further, a dynamic data structure allows reusability of data structures. It eliminates duplicate data structures in an order template and improves deployment time as a result of reusable data structures in an order template. An inheritance model provides for an ability to expand content of the dynamic data structure. Further, an element in a dynamic data structure can be another dynamic data structure.

According to the embodiment, FIG. 2 includes a composite cartridge 200, where a "cartridge" is a data object. Composite cartridge 200 includes an order template 201 and a data dictionary 202. Order template 201 includes a data node element "address," where data dictionary 202 defines the element "address" as a complex data type, where a complex data type is an example of a dynamic data structure. FIG. 2 further includes a component cartridge 210 that inherits from composite cartridge 200. Composite cartridge 210 includes a complex data type 211, where complex data type 211 includes a name parameter with a value of "Address," a namespace parameter with a value of "foo.com," and an abstract parameter with a value of "true." Composite cartridge 210 further includes a complex data type 212 that inherits from complex data type 211, where complex data type 212 includes a name parameter with a value of "Base_Address," a namespace parameter with a value of "foo.com," and an abstract parameter with a value of "true."

FIG. 2 further includes a component cartridge 220 that inherits from composite cartridge 210. Component cartridge 220 includes a complex data type 221 that inherits from complex data type 212, where complex data type 221 includes a name parameter with a value of "Canada_Address," a namespace parameter of "foo.com," and an abstract parameter with a value of "false." FIG. 2 further includes a component cartridge 230 that inherits from composite cartridge 210. Component cartridge 230 includes a complex data type 231 that inherits from complex data type 212, where complex data type 231 includes a name parameter with a value of "US_Address," a namespace parameter of "foo.com," and an abstract parameter with a value of "false."

Thus, elements contained in data dictionary 202, such as the element "address," can be extended in child/component cartridges and deployed without requiring the redeployment of composite cartridge 200. Further, a complex data type, or other dynamic data structure, can have different parameter values that are bound to the complex data type depending on the instance of the complex data type, as is further described below in greater detail. Thus, a complex data type, or other dynamic data structure, can identify its actual type or shape at runtime, as opposed to design time. Further, the complex data type, or other dynamic data structure, can be utilized to converted a name-value pair to a set of strongly-typed, or otherwise structured, parameters.

Figure 3:
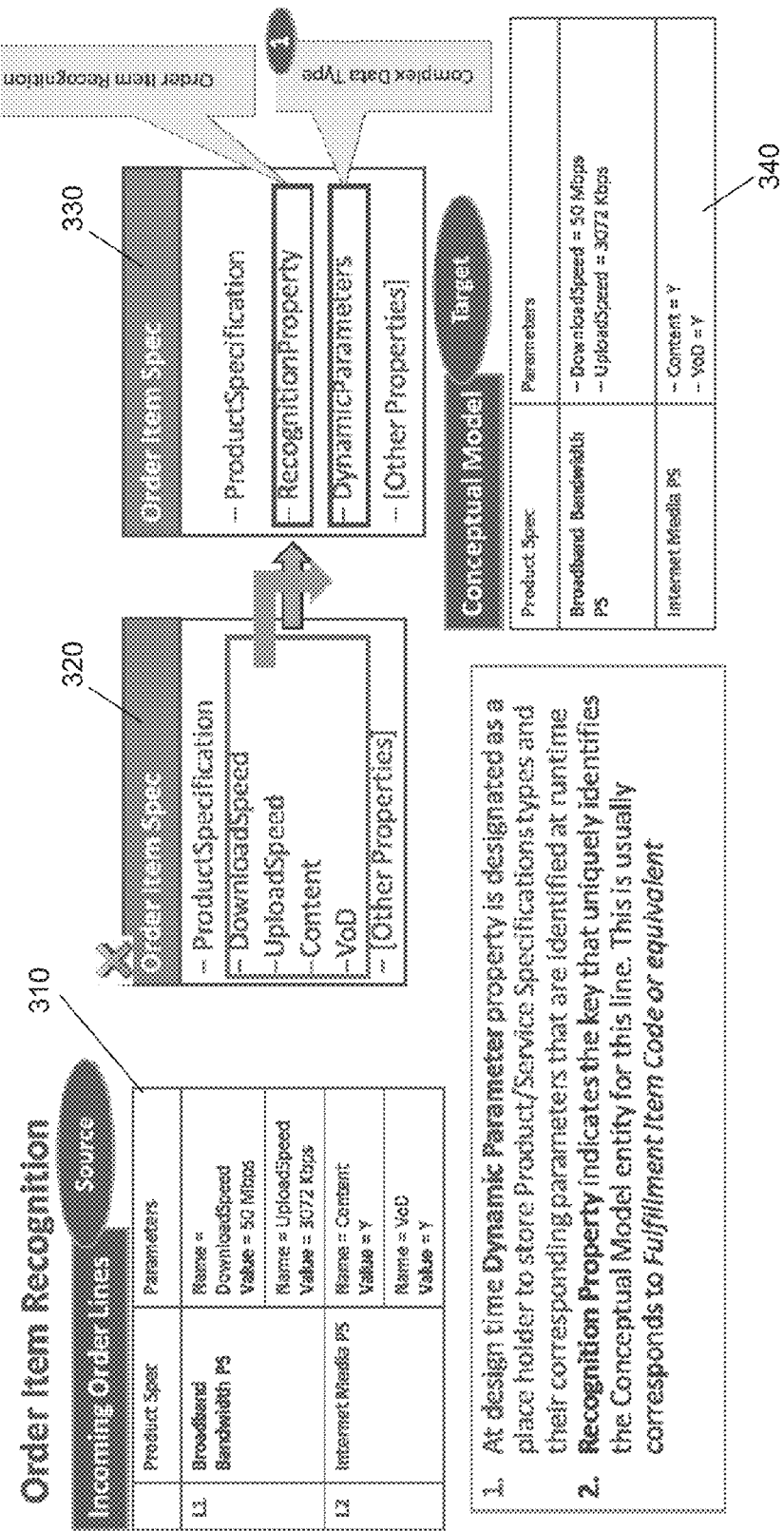
FIG. 3 illustrates an example of order item recognition, according to an embodiment of the invention.

FIG. 3 illustrates an example of order item recognition, according to an embodiment of the invention. FIG. 3 includes incoming order lines 310, which represent incoming order items that are received by an order fulfillment system. Incoming order lines 310 include order lines L1 and L2. Order line L1 includes a product specification, "Broadband Bandwidth PS," that includes two unstructured parameters that are name-value pairs. The first unstructured parameter includes a parameter name of "DownloadSpeed" and a parameter value of "50 Mbps." The second unstructured parameter includes a parameter name of "UploadSpeed" and a parameter value of "3072 Kbps." Order line L2 includes a product specification, "Internet Media PS," that includes two unstructured parameters that are also name-value pairs. The first unstructured parameter includes a parameter name of "Content" and a parameter value of "Y." The second unstructured parameter includes a parameter name of "VoD" and a parameter value of "Y." In an alternate embodiment, order lines L1 and L2 can include structured parameters that have a structured format that is different from a structured format utilized by the order fulfillment system.

FIG. 3 includes an order item specification 320 that can be defined by the order fulfillment system at design time to represent incoming order lines 310 (i.e., order lines L1 and L2). In order to represent both order lines L1 and L2, order specification 320 is defined to include all the unstructured parameters of both order lines L1 and L2 (i.e., "DownloadSpeed," "UploadSpeed," "Content," and "VoD"). However, in order to represent an increasing number of order lines, more unstructured parameters are required to be added to order specification 320. Thus, order specification 320 may not scale well as the number of order lines increase. Further, runtime instances of order specification 320 may include unstructured parameters that are not utilized.

FIG. 3 further includes an order item specification 330 that can alternatively be defined by the order fulfillment system at design time to represent incoming order lines 310 (i.e., order lines L1 and L2). Order item specification 330 is defined to include a dynamic parameter property. At design time, the dynamic parameter property is designated as a placeholder to store a conceptual model entity type, such as a product specification type or a service specification type, and corresponding structured parameters that are identified at runtime. In one embodiment, the structured parameters can be part of a dynamic data structure, such as a complex data type. Order item specification 330 is further defined to include a recognition property. At design time, the recognition property is designated as a placeholder to store a key that uniquely identifies a conceptual model entity that corresponds to the order line. The key can be, or can correspond to, a fulfillment item code. Further, the fulfillment code, or other type of key, can be located on the incoming order line, or incoming order item. Thus, the key can be data that is provided to the order fulfillment system, where the data helps to map the incoming order line, or incoming order item, to an internal conceptual model entity.

FIG. 3 further includes a conceptual model 340 that stores conceptual model entities. Conceptual model 340 includes a product specification "Broadband Bandwidth PS" that includes the structured parameters "DownloadSpeed" and "UploadSpeed." Conceptual model 340 further includes a product specification "Internet Media PS" that includes the structured parameters "Content," and "VoD." At runtime, the order fulfillment system can identify an conceptual model entity based on the recognition property of order item specification 330, retrieve the conceptual model entity from conceptual model 340, and can dynamically bind the unstructured parameter values from incoming order lines 310 to the structured parameters of the dynamic parameter property of order item specification 330. Such order item recognition and order item parameter binding is further described in greater detail in conjunction with FIG. 4.

Figure 4:
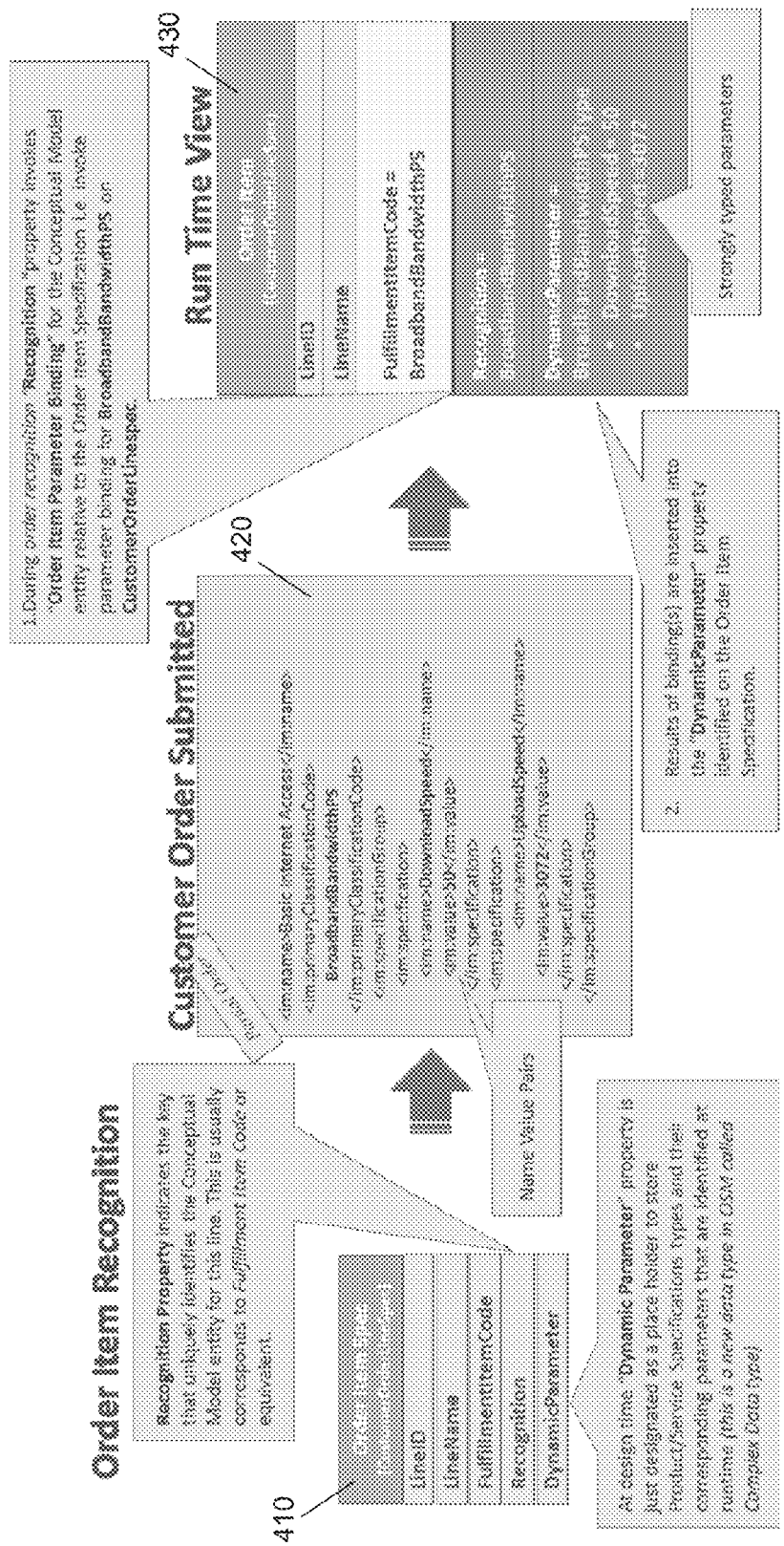
FIG. 4 illustrates an example of order item recognition and order item parameter binding, according to an embodiment of the invention.

FIG. 4 illustrates an example of order item recognition and order item parameter binding, according to an embodiment of the invention. FIG. 4 includes an order item specification 410 (i.e., a design time view of an order item specification). At design time, an order fulfillment system can define order item specification 410 to represent order items, such as order lines. The order fulfillment system can define order item specification 410 to include a recognition property. The recognition property stores a key that uniquely identifies a conceptual model entity that corresponds to an order item. The key can be, or can correspond to, a fulfillment item code. The order fulfillment system can further define order item specification 410 to include a dynamic parameter property. The dynamic parameter property stores a conceptual model entity type, such as a product specification type or a service specification type, and corresponding structured parameters that are identified at runtime. In one embodiment, the structured parameters can be part of a dynamic data structure, such as a complex data type.

FIG. 4 further includes an order item 420, where order item 420 is a portion of a customer order submitted to, and received by, the order fulfillment system. Order item 420 includes order data associated with the customer order. More specifically, order item 420 includes a fulfillment item code, or other type of key (e.g., fulfillment item code "BroadbandBandWidthPS"), and one or more unstructured parameters. In one embodiment, the unstructured parameters are name-value pairs, where each name-value pair includes a parameter name and a parameter value (e.g., parameter names "DownloadSpeed" and "UploadSpeed" and parameter values "50" and "3072"). In an alternate embodiment, order item 420 can include structured parameters rather than unstructured parameters, where the structured parameters have a structured format that is different from a structured format utilized by the order fulfillment system.

FIG. 4 further includes an order item specification 430 (i.e., a runtime view of an order item specification). At runtime, the order fulfillment system extracts the fulfillment item code, or other type of key, from order item 420, and stores the fulfillment item code within the recognition property of order item specification 430 (e.g., "Recognition=BroadbandBandwidthPS"). In one embodiment, the fulfillment item code, or other type of key, uniquely identifies a conceptual model entity, such as a product specification. Also, in one embodiment where the key is a fulfillment item code, the order fulfillment system stores the fulfillment item code within a fulfillment item code property of order item specification (e.g., "FulfillmentItemCode=BroadbandBandwidthPS").

Further, as part of order recognition, the order fulfillment system identifies a conceptual model entity based on the recognition property of order item specification 430. Subsequently, as part of order item parameter binding, the order fulfillment system dynamically binds one or more parameter values from the unstructured parameters of order item 420 to the dynamic parameter property of order item specification 430 based on the identified conceptual model entity. More specifically, the order fulfillment system determines a dynamic data structure, such as a complex data type, to be generated based on the identified conceptual model entity and generates the determined dynamic data structure. The order fulfillment system further determines which parameter names and parameters values to extract from the unstructured parameters of order item 420 based on the identified conceptual model entity and extracts the determined parameter names and parameter values. The extraction can be done using a dynamically generated query of the order data, such as a dynamically generated XQuery, where the dynamically generated query can include a dynamically generated query expression. The dynamically generated query can be generated using a design pattern feature of an integrated design environment, such as an "Oracle Communications Design Studio" product by Oracle Corporation. The order fulfillment system further binds the extracted parameter values to the structured parameters of the dynamic data structure. The order fulfillment system further stores the dynamic data structure, including the bound parameter values, within the dynamic parameter property of order item specification 430 (e.g., "Dynamic Parameter=BroadbandBandwidthPSType: DownloadSpeed=50; UploadSpeed=3072"). In the illustrated embodiment of FIG. 4, the structured parameters of the dynamic property of order item specification 430 are strongly-typed parameters.

Figure 5:
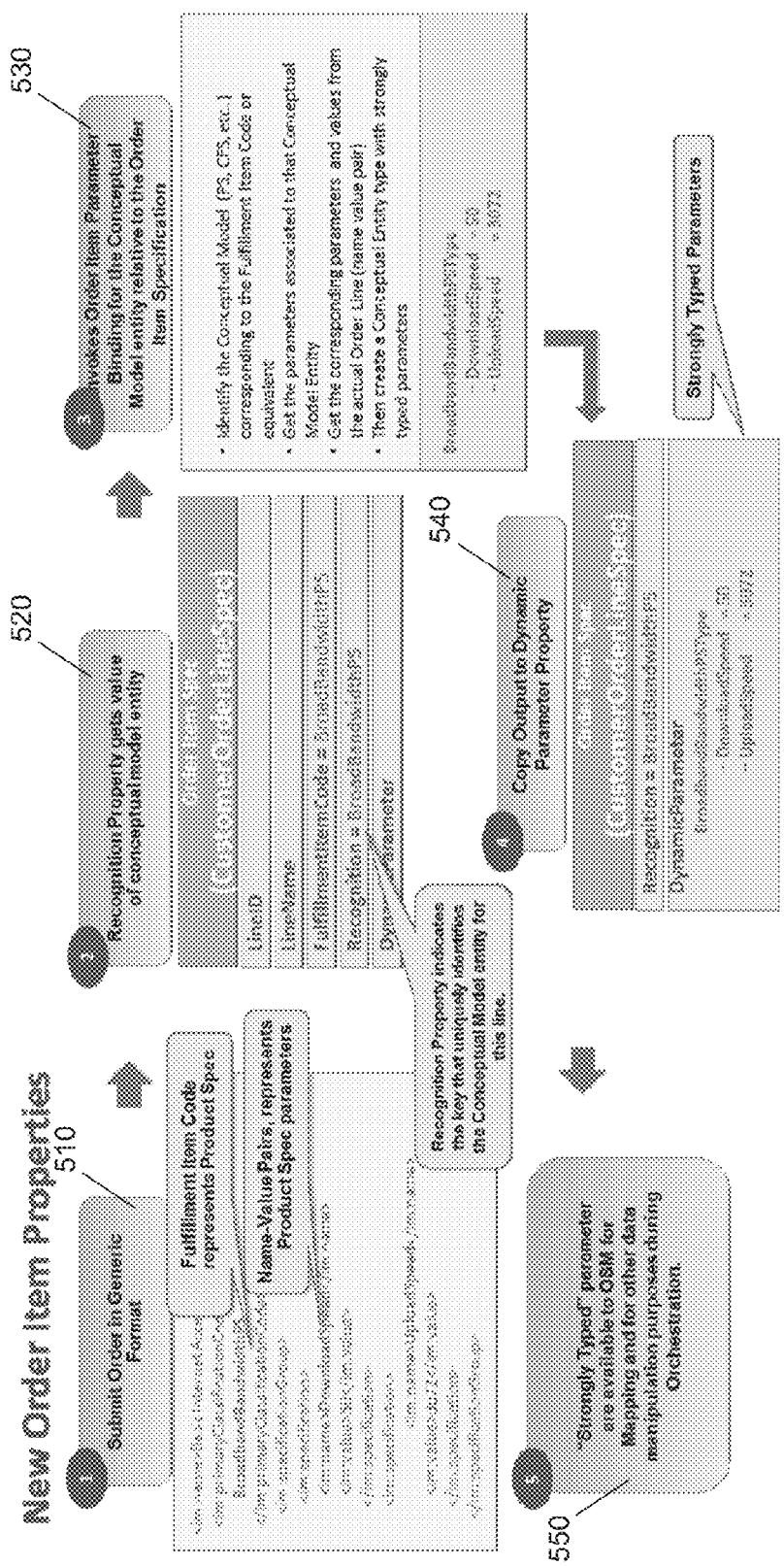
FIG. 5 illustrates another example of order item recognition and order item parameter binding, according to an embodiment of the invention.

FIG. 5 illustrates another example of order item recognition and order item parameter binding, according to an embodiment of the invention. At 510, an order is submitted to, and received by, an order fulfillment system, where the order can be in a generic format. The order can include one or more order items, such as order lines, where an order item can include a fulfillment item code (e.g., "BroadbandBandwidthPS"), or other type of key. In one embodiment, the fulfillment item code, or other type of key, can uniquely identify a conceptual model entity, such as a product specification. The order can further include one or more unstructured parameters, where the unstructured parameters can be name-value pairs, where each name-value pair includes a parameter name and a parameter value (e.g., parameter names "DownloadSpeed" and "UploadSpeed" and parameter values "50" and "3072"). In an alternate embodiment, the order can include structured parameters rather than unstructured parameters, where the structured parameters have a structured format that is different from a structured format utilized by the order fulfillment system.

At 520, the order fulfillment system extracts the fulfillment item code, or other type of key, and stores the fulfillment item code within a recognition property of an order item specification (e.g., "Recognition=BroadbandBandwidth PS"). Thus, the recognition property can uniquely identify a conceptual model entity, such as a product specification. In an embodiment where the key is a fulfillment item code, the order fulfillment system can further store the fulfillment item code within a fulfillment item code property of the order item specification (e.g., "FulfillmentItemCode="BroadbandBandwidthPS").

At 530, the order fulfillment system invokes order item parameter binding for the conceptual model entity relative to the order item specification. More specifically, the order fulfillment system can identify the conceptual model entity that corresponds to the fulfillment item code, or other type of key, that is stored within the recognition property of the order item specification. The order fulfillment system can further select one or more parameters associated with the identified conceptual model entity. The order fulfillment system can further extract the corresponding parameter names and parameters values from the unstructured parameters of the order item specification. The order fulfillment system can further generate a dynamic data structure, such as a complex data type, that includes one or more structured parameters, such as strongly-typed parameters, and store the extracted parameter values within the structured parameters of the dynamic data structure (e.g., "BroadbandBandwidthPSType: DownloadSpeed=50; UploadSpeed=3072").

At 540, the order fulfillment system stores the dynamic data structure within a dynamic parameter property of the order item specification (e.g., Dynamic Parameter=BroadbandBandwidthPS: DownloadSpeed=50; UploadSpeed=3072). The dynamic parameter property thus includes a dynamic data structure with structured parameters, such as strongly-typed parameters.

At 550, the structured parameters of the dynamic data structure are available to the order fulfillment system for data mapping and other data manipulation purposes, such as transformation.

Figure 6:
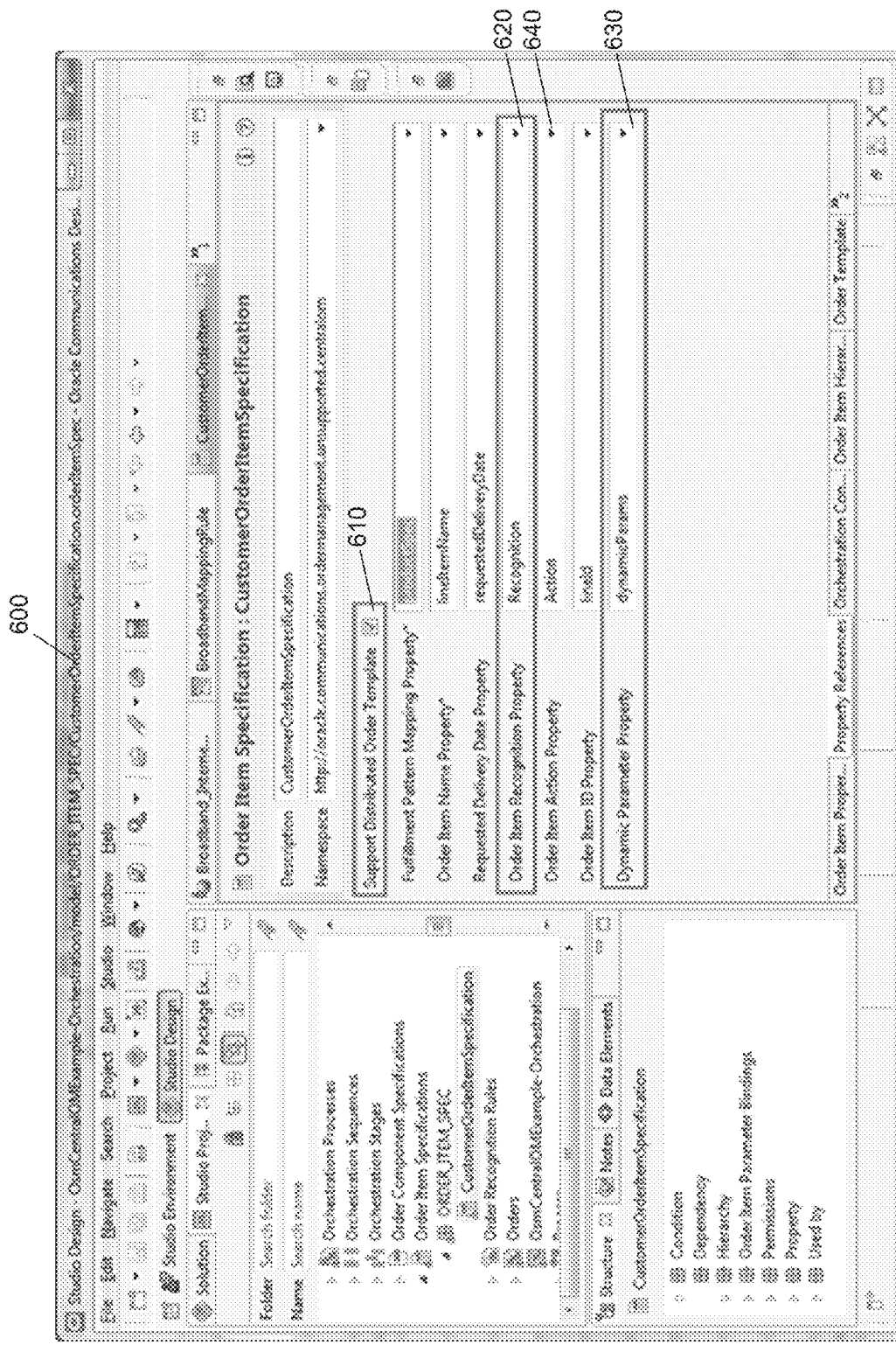
FIG. 6 illustrates an example user interface that displays an order item specification, according to an embodiment of the invention.

FIG. 6 illustrates an example user interface 600 that displays an order item specification, according to an embodiment of the invention. The displayed order item specification includes support distributed order template checkbox 610. In order to use a dynamic data structure, such as a complex data type, within the displayed order item specification, a user can "click" on, or otherwise interact with, support distributed order template checkbox 610. The displayed order item specification further includes order item recognition property 620. Order item recognition property 620 indicates a key, such as a fulfillment item code, that uniquely identifies a conceptual model entity, such as a product specification, that corresponds to an order item, such as an order line. The displayed order item specification further includes dynamic parameter property 630. At design time, dynamic property 630 is a placeholder that stores a conceptual model type, such as a product specification type or a service specification type, and corresponding structured parameters that are identified at runtime. In one embodiment, dynamic property 630 stores a dynamic data structure, such as a complex data type, that includes the corresponding structured parameters. The displayed order item specification further includes order item action property 640. Order item action property 640 indicates an action code that identifies a conceptual model entity that corresponds to the order item.

Figure 7:
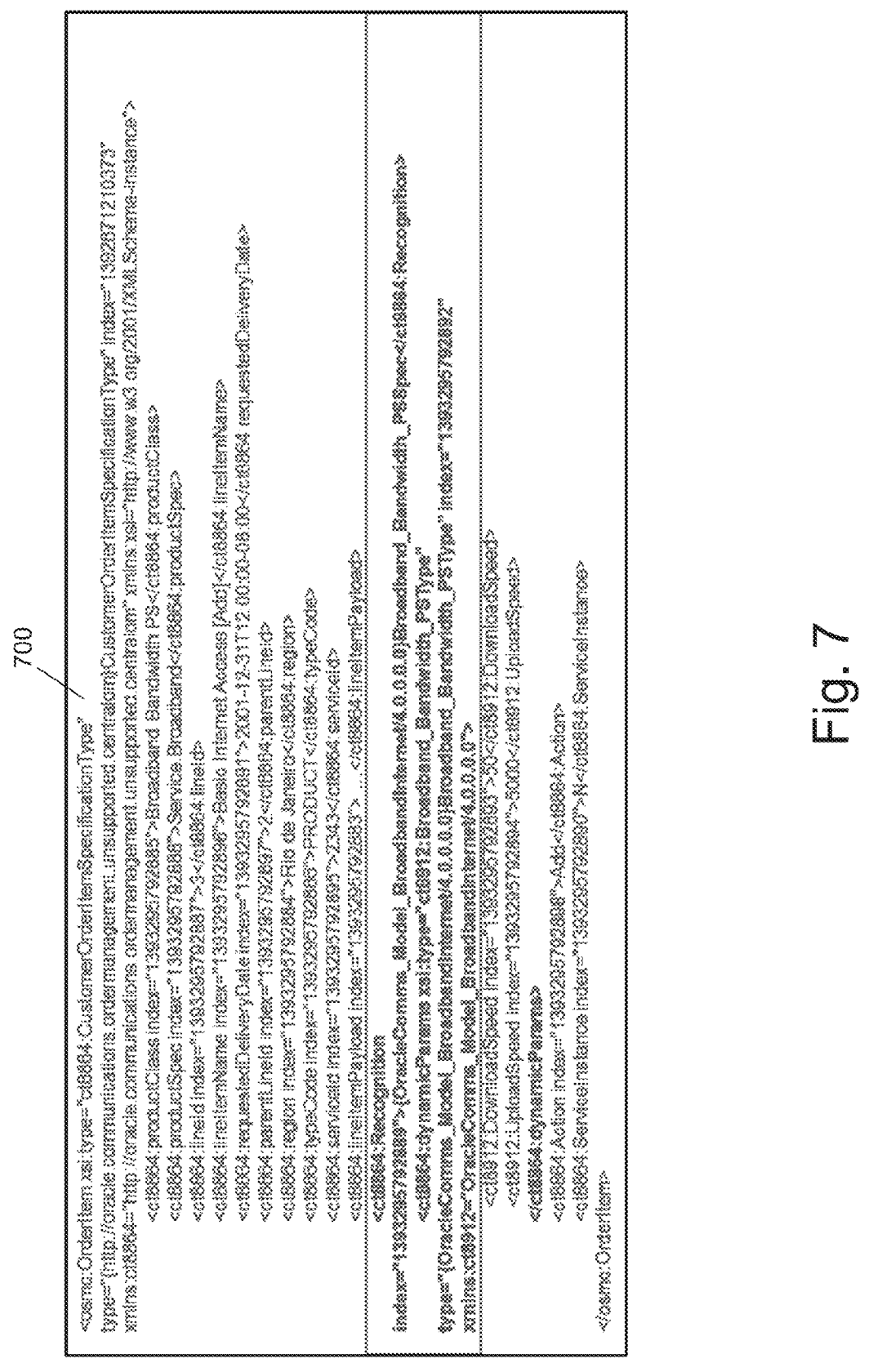

FIG. 7 illustrates an example of order data for an order 700, according to an embodiment of the invention. In the illustrated embodiment of FIG. 7, the order data for order 700 is extensible markup language ("XML") data. However, in alternate embodiments, the order data for order 700 can be another type of data (i.e., can be in another format). In the illustrated embodiment of FIG. 7, order 700 includes the following portion of order data:
<ct8864:Recognition index="1393295792889">
{OracleComms_Model_BroadbandInternet/
4.0.0.0.0}Broadband_Bandwidth_PSSpec </ct8864:Recognition>

The aforementioned portion of order data for order 700 identifies a fulfillment item code, or other key, that uniquely identifies a conceptual model entity associated with order 700 (e.g., "Broadband_Bandwidth_PSSpec").

In the illustrated embodiment of FIG. 7, order 700 further includes the following portion of order data:
<ct8864:dynamicParams
xsi:type="ct8912:Broadband_Bandwidth_PSType"
type="{OracleComms_Model_BroadbandInternet/
4.0.0.0.0}Broadband_Bandwidth_PST ype"
index="1393295792892"
xmlns:ct8912="OracleCommsModelBroadbandInternet/
4.0.0.0.0">
<ct8912:DownloadSpeed index="1393295792893">50</ct8912:DownloadSpeed>
<ct8912:UploadSpeed index="1393295792894">5000</ct8912:UploadSpeed>
</ct8864:dynamicParams>

The aforementioned portion of order data for order 700 identifies unstructured parameters that are name-value pairs associated with order 700 (e.g., parameter names "DownloadSpeed" and "UploadSpeed" and parameter values "50"

and "5000"). In an alternate embodiment, order 700 can include structured parameters rather than unstructured parameters.

FIG. 8 illustrates an example of updating order data for an order 800, according to an embodiment of the invention. In the illustrated embodiment of FIG. 8, the order data for order 800 is extensible markup language ("XML") data. However, in alternate embodiments, the order data for order 800 can be another type of data (i.e., can be in another format). In the illustrated embodiment of FIG. 8, order 800 includes the following portion of order data:

Path="/ControlData/OrderItem[@index='1112223331']
[@type='{http://oracle.communications.order
managemen.unsupported.centralom}Customer
OrderItemSpecificationType']/dynamicParams
[@index='2223334441']
[@type='{OracleComms_Model_BroadbandIntern
et/4.0.0.0.0.0.0}Broadband_Bandwidth_PSType']/Upload-Speed">10000

The aforementioned portion of order data for order 800 is an instruction to update the value of a parameter "UploadSpeed" from "5000" to "10000."

Figure 9:
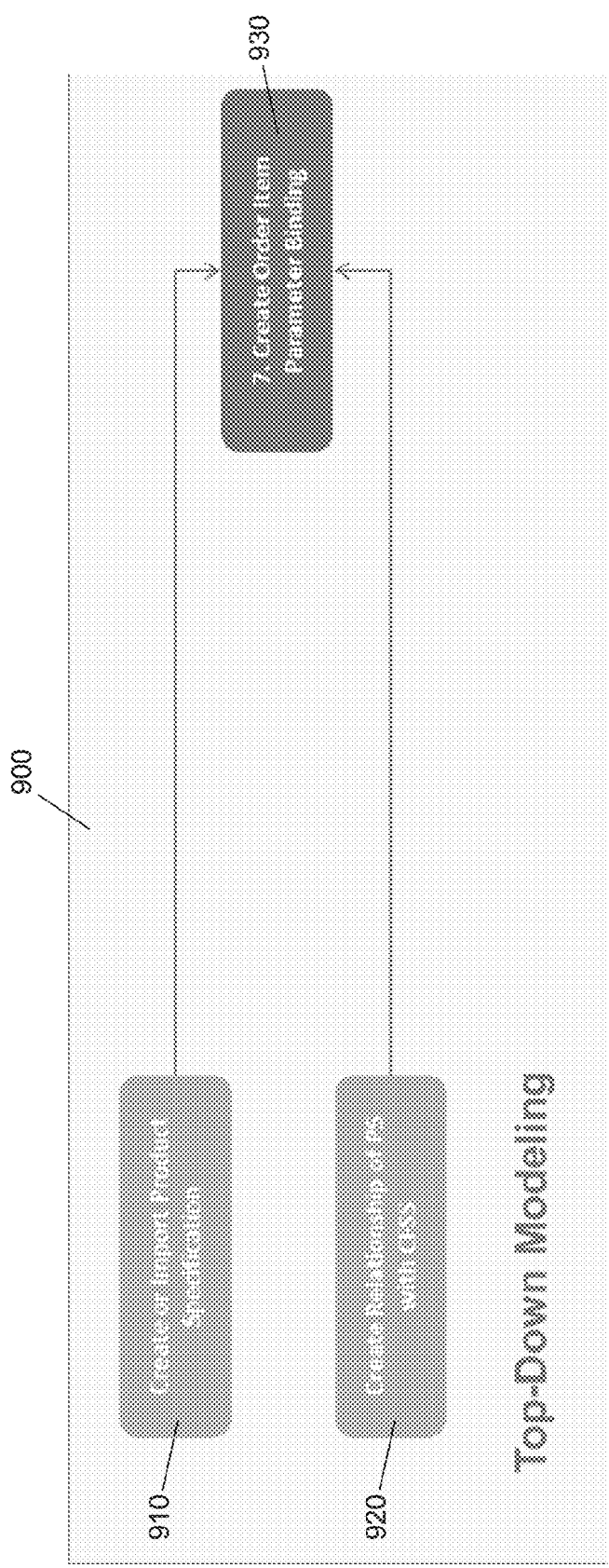
FIG. 9 illustrates an example model of creating an order item parameter binding for an order item specification, according to an embodiment of the invention.

FIG. 9 illustrates an example model 900 of creating an order item parameter binding for an order item specification, according to an embodiment of the invention. At 910, a product specification is created or imported, where a product specification is an example of a conceptual model entity. At 920, a relationship is created between the product specification and a customer-facing service specification. At 930, as part of the relationship, an order item parameter binding is created for the product specification. More specifically, a dynamically generated query of order data is defined, where the dynamically generated query includes a dynamically generated expression that extracts one or more parameter names and one or more parameter values of arbitrary parameters of order data, such as unstructured parameters or structured parameters. The dynamically generated query can be a dynamically generated XQuery that includes a dynamically generates XQuery expression.

Figure 10:
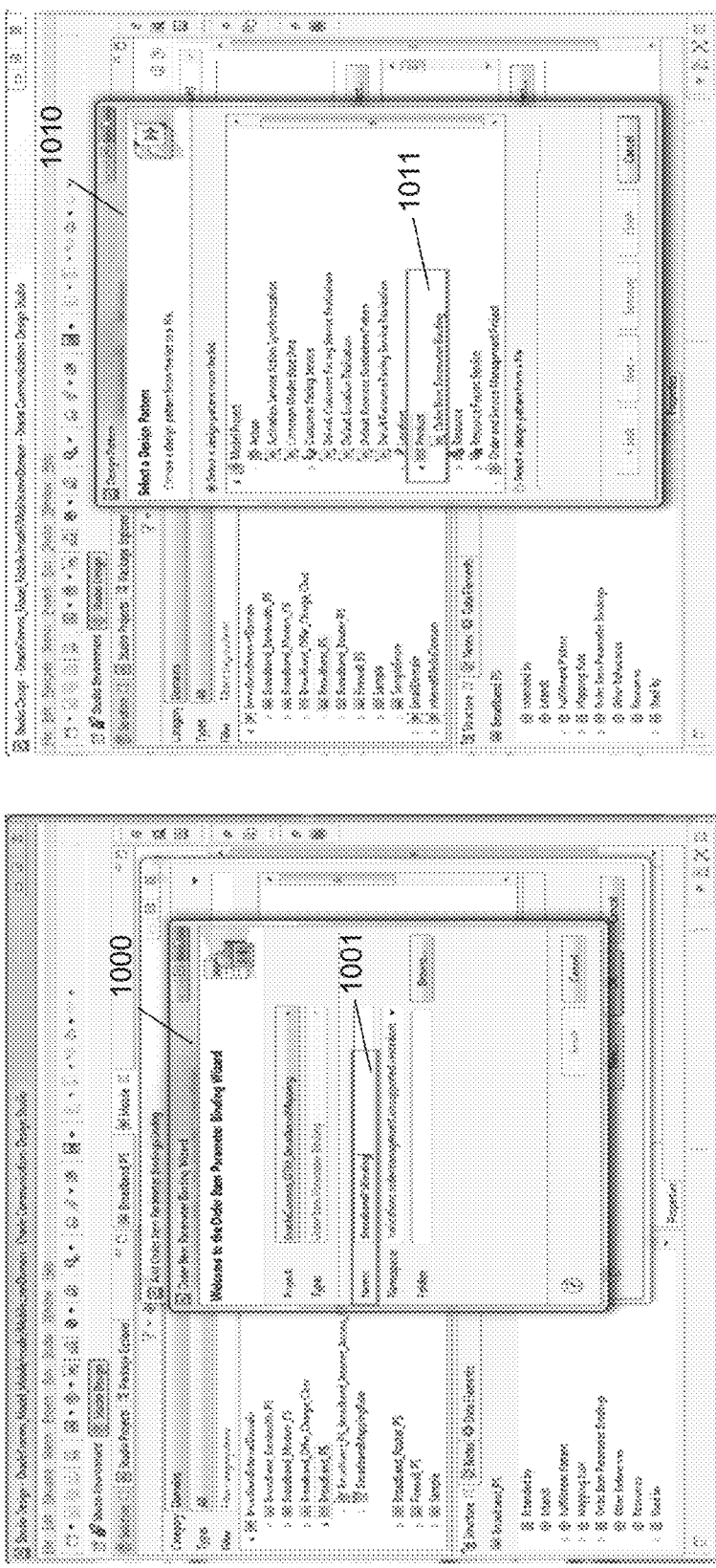
FIG. 10 illustrates example user interfaces that can be used to create an order item parameter binding for an order item specification, according to an embodiment of the invention.

FIG. 10 illustrates example user interfaces 1000 and 1010 that can be used to create an order item parameter binding for an order item specification, according to an embodiment of the invention. User interface 1000 can be used to manually create an order item parameter binding for an order item specification. User interface 1000 includes name 1001 where a user can create a name for the manually created order item parameter binding. User interface 1010 can be used to dynamically create an order item parameter binding for an order item specification using a design pattern. User interface 1010 includes list 1011 where a user can select a design pattern. An order item parameter binding can be dynamically created based on the selected design pattern.

Figure 11:
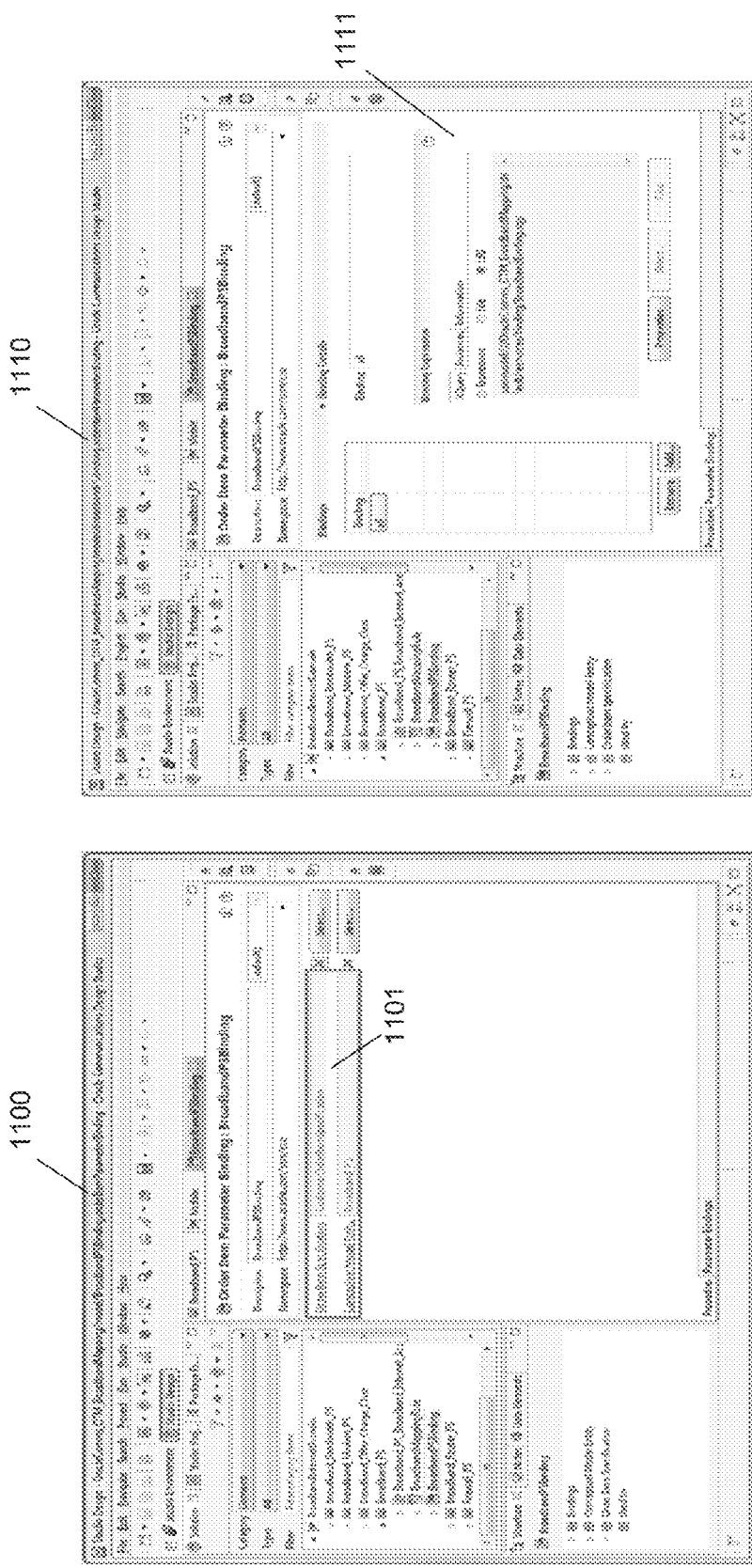
FIG. 11 illustrates example user interfaces that can be used to create an order item parameter binding for an order item specification, according to an embodiment of the invention.

FIG. 11 illustrates example user interfaces 1100 and 1110 that can be used to create an order item parameter binding for an order item specification, according to an embodiment of the invention. User interface 1100 can be used to associate an order item specification with a conceptual model entity. User interface 1100 includes association 1101 where a user can select an order item specification and select a conceptual model entity to associate with the order item specification. User interface 1110 can be used to define a query that is used to extract parameter names and parameter values from arbitrary parameters, such as unstructured parameters or structured parameters, of order data and map the extracted parameter values to structured parameters of a dynamic data structure. User interface 1110 includes query 1111 where a user can define a query expression that is used to extract parameter names and parameter values from arbitrary parameters, such as unstructured parameters or structured parameters, of order data and map the extracted parameter values to structured parameters of a dynamic data structure. In one embodiment, the query can be an XQuery, and the query expression can be an XQuery expression.

Figure 12:
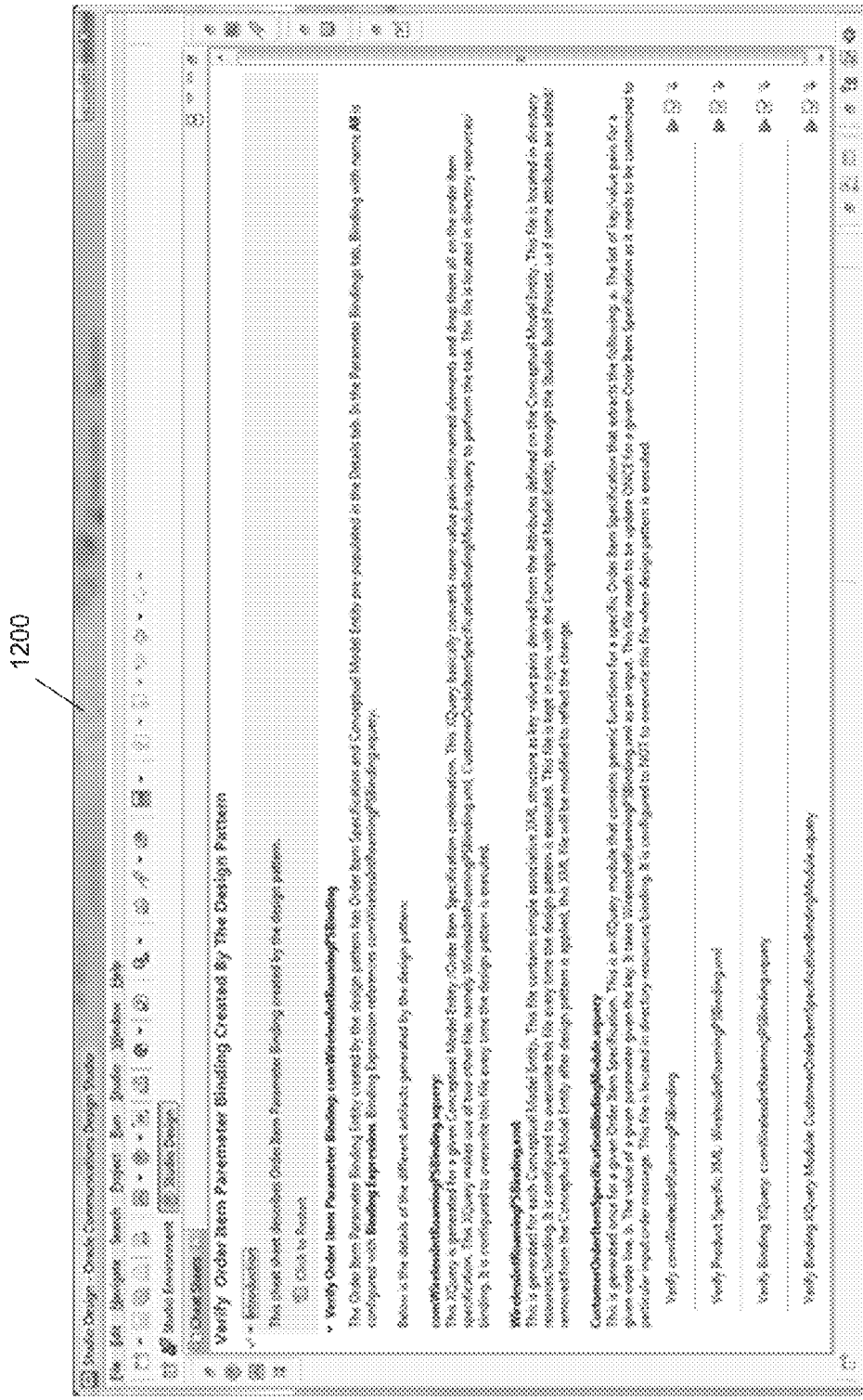
FIG. 12 illustrates an example user interface that displays an order item parameter binding for an order item specification, according to an embodiment of the invention.

FIG. 12 illustrates an example user interface 1200 that displays an order item parameter binding for an order item specification, according to an embodiment of the invention. User interface 1200 displays the following modules created for an order item parameter binding for a product specification (e.g., "WirelessIntRoamingPS"): (a) comWirelessIntRoamingPSBinding.xquery; (b) WirelessIntRoamingPsBinding.xml; and (c) CustomerOrderItemSpecificationBindingModule.xquery. comWirelessIntRoamingPSBinding.xquery is generated for a specified conceptual model entity/order item specification combination. The XQuery converts name-value pairs into named elements and places them within the order item specification. WirelessIntRoamingPsBinding.xml is generated for the conceptual model entity. This file contains an XML structure as name-value pairs derived from attributes defined on the conceptual model entity. The file can be located in a directory "resources/binding." This file can be overwritten every time a design pattern is executed. The file can be kept in synch with the conceptual model entity (i.e., if some attributes are added or removed from the conceptual model entity after the design pattern is applied, the XML file can be modified to reflect the change). CustomerOrderItemSpecificationBindingModule.xquery is generated once for a specified order item specification. This is an XQuery module that contains generic functions for a specific order item specification that extracts the following: (a) a list of name/value pairs for a specified order line (or order item); and (b) a value of a specified parameter based on the specified key (taking comWirelessIntRoamingPSBinding.xquery as an input).

Figure 13:
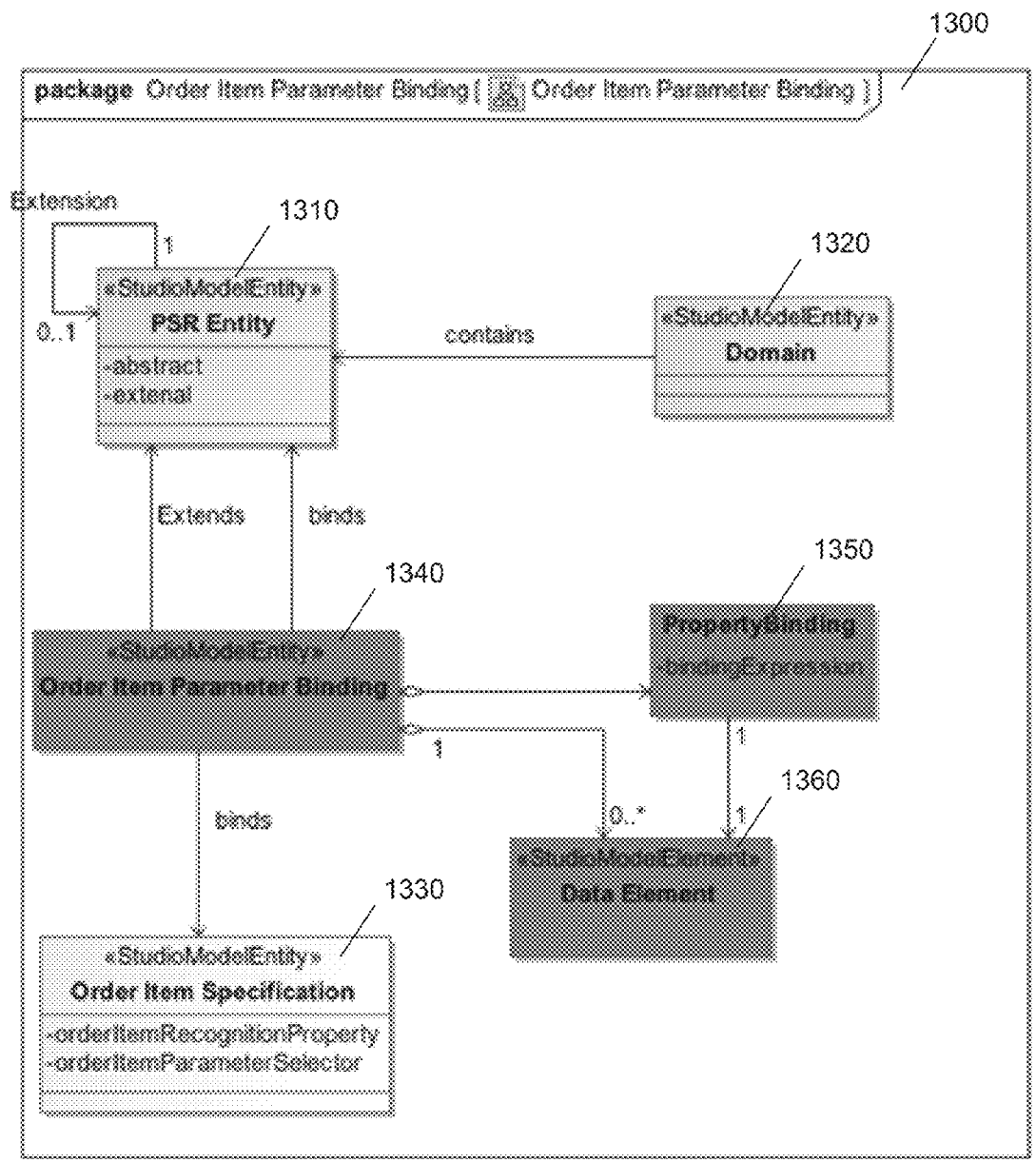
FIG. 13 illustrates an order item parameter binding domain model, according to an embodiment of the invention.

FIG. 13 illustrates an order item parameter binding domain model 1300, according to an embodiment of the invention. Order item parameter binding domain model 1300 includes a product specification entity 1310. Product specification entity 1310 defines the product specification, or other type of conceptual model entity, that is to be bound to an order item. Thus, product specification entity 1310 represents a product specification, or other type of conceptual model entity. Product specification entity 1310 contains a domain 1320. Domain 1320 defines a domain associated with the product specification, or other type of conceptual model entity, represented by product specification entity 1310.

Order item parameter binding domain model 1300 further includes an order item specification 1330. Order item specification 1330 defines an order item, such as an order line, that is a portion of an order. Thus, order item specification 1330 represents an order item of an incoming order. Order item specification 1330 includes a recognition property (e.g., "orderItemRecognitionProperty") that stores a key, such as a fulfillment item code, that uniquely identifies a product specification, or other type of conceptual model entity, represented by product specification entity 1310. Order item specification 1330 further includes a dynamic parameter property (e.g., "orderItemParameterSelector") that stores one or more structured parameters, such as strongly-typed parameters, that are defined at runtime.

Order item parameter binding domain model 1300 further includes an order item parameter binding 1340. Order item parameter binding 1340 defines a mapping of one or more arbitrary parameters, such as unstructured parameters or structured parameters, of an incoming order item represented by order item specification 1330 to one or more structured parameters of a product specification, or other type of conceptual model entity, represented by product specification entity 1310, where the one or more parameter values of the one or more arbitrary parameters of the incoming order item are stored as parameter values of the one or more structured parameters stored within the dynamic parameter property of order item specification 1330. Order item parameter binding 1340 includes a property binding 1350 and a data element 1360. Property binding 1350 defines a data structure that stores a query expression, such as an XQuery expression, that extracts the one or more parameter names and parameter values from the one or more arbitrary parameters of the incoming order item and stores the extracted parameter values within one or more structured parameters stored within the dynamic parameter property of order item specification 1330. Data element 1360 defines a structured parameter of a product specification, or other type of conceptual model entity, represented by product specification entity 1310, that an arbitrary parameter of an incoming order item is mapped to.

Figure 14:
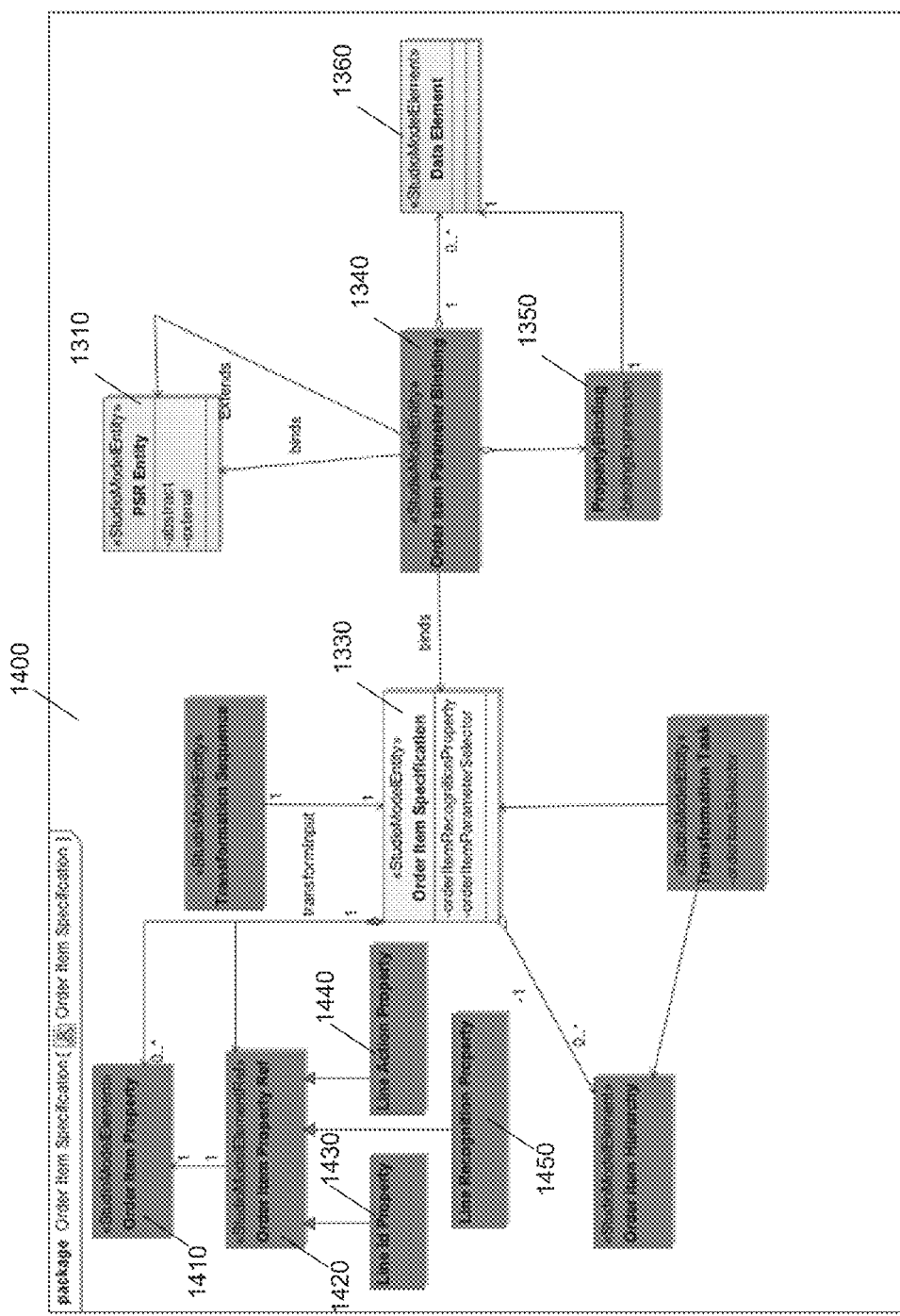
FIG. 14 illustrates an order item specification domain model, according to an embodiment of the invention.

FIG. 14 illustrates an order item specification domain model 1400, according to an embodiment of the invention. Order item specification domain model 1400 includes product specification entity 1310, order item specification 1330, order item parameter binding 1340, property binding 1350, and data element 1360, which are previously described in conjunction with FIG. 13. Order item specification domain model 1400 further includes order item property 1410 which defines a property for order item specification 1330. Order item specification domain model 1400 further includes order item property reference 1420 which inherits from order item property 1410 and further defines a property for order item specification 1330. Order item specification domain model 1400 further includes order item identity property 1430 (identified in FIG. 14 as "Line Id Property"), order item action property 1440 (identified in FIG. 14 as "Line Action Property"), and order item recognition property 1450 (identified in FIG. 14 as "Line Recognition Property"), which are specific instances of order item property reference 1420. Order item identity property 1430 stores a unique identifier that uniquely identifies the order item represented by order item specification 1330. Order item action property 1440 stores an action type of the order item represented by order item specification 1330. Order item recognition property 1450 stores a key, such as a fulfillment item code, that uniquely identifies a conceptual model entity, such as a product specification represented by product specification entity 1310.

Figure 15:
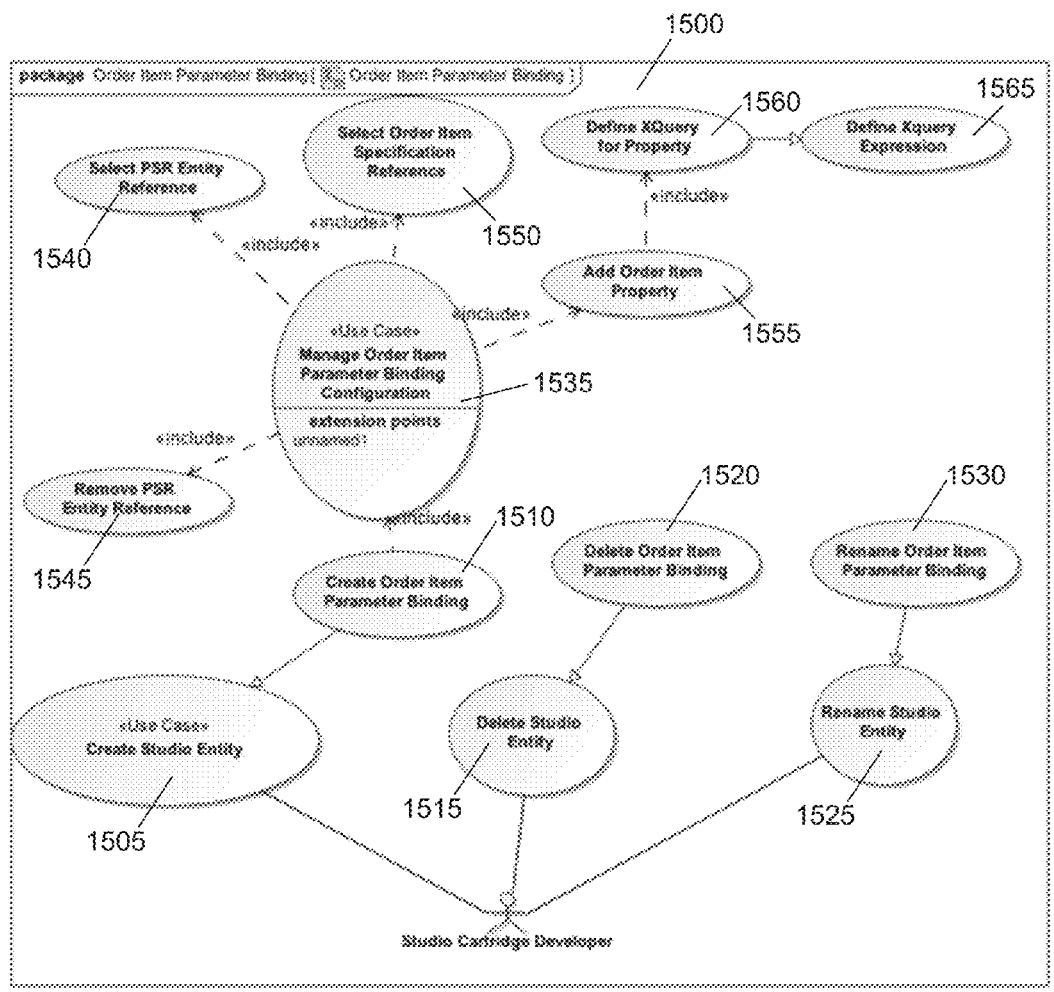
FIG. 15 illustrates an example of managing an order item parameter binding configuration, according to an embodiment of the invention.

FIG. 15 illustrates an example of managing an order item parameter binding configuration 1500, according to an embodiment of the invention. Order item parameter binding configuration 1500 includes a create studio entity action 1505, which allows a user to create a conceptual model entity, such as a product specification. Order item parameter binding configuration 1500 further includes a create order item parameter binding action 1510, which allows a user to create an order item parameter binding for the conceptual model entity. Order item parameter binding configuration 1500 further includes a delete studio entity action 1515, which allows a user to delete a conceptual model entity, such as a product specification. Order item parameter binding configuration 1500 further includes a delete order item parameter binding action 1520, which allows a user to delete an order item parameter binding from the conceptual model entity. Order item parameter binding configuration 1500 further includes a rename studio entity action 1525, which allows a user to rename a conceptual model entity, such as a product specification. Order item parameter binding configuration 1500 further includes a rename order item parameter binding action 1530, which allows a user to rename an order item parameter binding for the conceptual model entity.

Order item parameter binding configuration 1500 further includes a manage order item parameter binding configuration action 1535, which allows a user to perform one or more actions to manage an order item parameter binding configuration created for a conceptual model entity, such as a product specification. The one or more actions can include the following actions: select conceptual model entity reference action 1540 (identified in FIG. 15 as "Select PSR Entity Reference"); remove conceptual model entity reference action 1545 (identified in FIG. 15 as "Remove PSR Entity Reference"), select order item specification reference action 1550, add order item property action 1555; define XQuery for property action 1560; or define XQuery expression action 1565. Select conceptual model entity reference action 1540 allows a user to select a conceptual model entity, such as a product specification, where the order item parameter binding refers to the selected conceptual model entity. Remove conceptual model entity reference action 1545 allows a user to remove a selected conceptual model entity. Select order item specification reference action 1550 allows a user to select an order item specification, where the order item parameter binding refers to the selected order item specification. Add order item property action 1555 allows a user to add a property to the selected order item specification. Define XQuery for property action 1560 allows a user to define a query, such as an XQuery, for the selected property. Define XQuery expression 1565 allows a user to define a query expression, such as an XQuery expression for the selected query.

Figure 16:
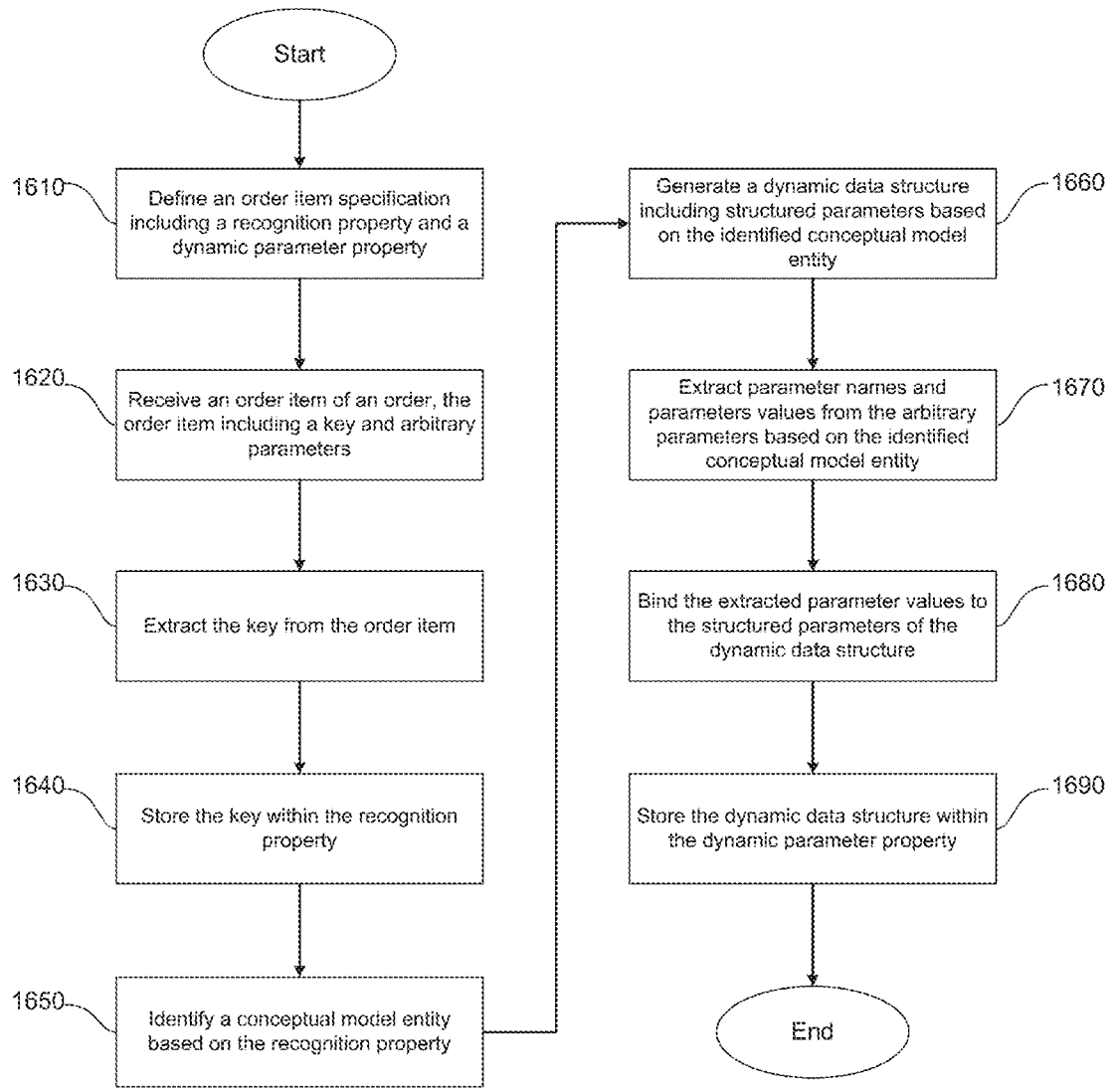
FIG. 16 illustrates a flow diagram of the functionality of an order item recognition module, according to an embodiment of the invention.

FIG. 16 illustrates a flow diagram of the functionality of an order item recognition module (such as order item recognition module 16 of FIG. 1), according to an embodiment of the invention. In one embodiment, the functionality of the flow diagram of FIG. 16 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 1610. At 1610, an order item specification is defined, where the order item specification includes a recognition property and a dynamic parameter property. The flow then proceeds to 1620.

At 1620, an order item of an order is received, where the order item includes order data, and where the order data includes a key that uniquely identifies a conceptual model entity and one or more arbitrary parameters, each arbitrary parameter including a parameter name and a parameter value. In some embodiments, the arbitrary parameters can be unstructured parameters. In other embodiments, the arbitrary parameters can be structured parameters. In certain embodiments, the key can be a fulfillment item code. Further, in certain embodiments, the conceptual model entity can be an order item entity that includes metadata that defines a capability. In some of these embodiments, the order item entity can be a product specification including metadata that defines a product. Further, in some of these embodiments, the conceptual model entity can be stored with a conceptual model, where the conceptual model comprises a data store that stores metadata, and where the conceptual model defines a structure of one or more order item entities. The flow then proceeds to 1630.

At 1630, the key is extracted from the order data of the order item. In some embodiments where the key is a fulfillment item code, the fulfillment item code can be stored within a fulfillment item code property of the order item specification. The flow then proceeds to 1640.

At 1640, the key is stored within the recognition property of the order item specification. The flow then proceeds to 1650.

At 1650, the conceptual model entity is identified based on the recognition property. The flow then proceeds to 1660.

At 1660, a dynamic data structure is generated including one or more structured parameters, where the one or more structured parameters are based on the identified conceptual model entity. In certain embodiments, the dynamic data structure can also include a conceptual model entity type that defines the one or more structured parameters. Further, in certain embodiments, the one or more structured parameters can be strongly-typed parameters. In certain embodiments, the dynamic data structure can be a complex data type. The flow then proceeds to 1670.

At 1670, one or more parameter names and one or more parameter values are extracted from the arbitrary parameters included within the order data of the order item based on the identified conceptual model entity. In certain embodiments, in order to extract the one or more parameter names and one or more parameter values from the arbitrary parameters, an expression language query can be executed on the order data contained within the order item. In some of these embodiments, the expression language query can be an XQuery query that contains an XQuery expression. The flow then proceeds to 1680.

At 1680, the one or more extracted parameter values are bound to the one or more structured parameters of the dynamic data structure. The flow then proceeds to 1690.

At 1690, the dynamic data structure is stored within the dynamic parameter property. Therefore, one or more parameter values from the one or more arbitrary parameters can be dynamically bound to the dynamic parameter property based on the identified conceptual model entity.

Thus, in one embodiment, an order fulfillment system can perform order item recognition and order item parameter binding in order to dynamically bind parameter values to a strongly-typed data structure based on a key contained within an order item. The metadata requirements for this feature can be very minimal, and, once the metadata is defined, the metadata is not required to be changed even if a current product, service, or resource is modified. Further, minimal changes to the metadata are required if a new product, service, or resource is introduced. This can reduce regression risk and improve time to market. Further, representing order item parameter values using a strongly-typed data structure can improve validation and processing of the order item by the order fulfillment system, and other upstream systems. Even further, representing order item parameter values using a strongly-typed data structure can assist in a user's ability to view the order item data.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to recognize an order item, the recognizing comprising:
    defining a generic order item specification comprising a dynamic parameter property;
    receiving an order comprising a plurality of order items, a first of the order items comprising a key and one or more arbitrary parameters, each arbitrary parameter comprising a parameter value;
    extracting the key from the first order item;
    identifying a conceptual model based on the extracted key;
    recognizing one or more structured parameters that correspond to the one or more arbitrary parameters of the first order item based on the conceptual model; and
    generating a dynamic data structure comprising the recognized one or more structured parameters by dynamically binding the one or more parameter values from the arbitrary parameters to the dynamic parameter property.

2. The computer-readable medium of claim 1, where the dynamic binding further comprises:
    extracting the one or more parameter values from the arbitrary parameters based on the identified conceptual model; and
    generating a specification specific to the first order item by dynamically binding the extracted parameter values from the arbitrary parameters to the structured parameters of the dynamic data structure.

3. The computer-readable medium of claim 2, wherein the extracting the parameter values from the arbitrary parameters further comprises executing an expression language query on order data contained within the first order item.

4. The computer-readable medium of claim 3, wherein the expression language query comprises an XQuery query.

5. The computer-readable medium of claim 2, wherein the dynamic data structure further comprises a conceptual model type that defines the structured parameters.

6. The computer-readable medium of claim 1, wherein the key comprises a fulfillment item code for the first order item.

7. The computer-readable medium of claim 1, wherein the conceptual model comprises an order item entity comprising metadata that defines one or more order item specifications for a product or service and the order item entity comprises an order item specification comprising metadata that defines an order item.

8. The computer-readable medium of claim 1, wherein the conceptual model is stored with a conceptual model structure, wherein the conceptual model structure comprises a data store that stores metadata, and wherein the conceptual model structure defines a structure of one or more order item entities.

9. The computer-readable medium of claim 1, wherein the arbitrary parameters comprise at least one of: one or more unstructured parameters; or one or more structured parameters.

10. A computer-implemented method for recognizing an item of an order, the computer-implemented method comprising:
    defining a generic order item specification comprising a dynamic parameter property;
    receiving an order comprising a plurality of order items, a first of the order items comprising a key and one or more arbitrary parameters, each arbitrary parameter comprising a parameter value;
    extracting the key from the first order item;
    identifying a conceptual model based on the extracted key;
    recognizing one or more structured parameters that correspond to the one or more arbitrary parameters of the first order item based on the conceptual model; and
    generating a dynamic data structure comprising the recognized one or more structured parameters by dynamically binding the one or more parameter values from the arbitrary parameters to the dynamic parameter property.

11. The computer-implemented method of claim 10, where the dynamic binding further comprises:
    extracting the one or more parameter values from the arbitrary parameters based on the identified conceptual model; and
    generating a specification specific to the first order item by dynamically binding the extracted parameter values from the arbitrary parameters to the structured parameters of the dynamic data structure.

12. The computer-implemented method of claim 11, wherein the extracting the parameter values from the arbitrary parameters further comprises executing an expression language query on order data contained within the first order item.

13. The computer-implemented method of claim 12, wherein the expression language query comprises an XQuery query.

14. The computer-implemented method of claim 11, wherein the dynamic data structure further comprises a conceptual model type that defines the structured parameters.

15. The computer-implemented method of claim 10, wherein,
    the generic order item specification comprising the dynamic parameter property is defined at design time, and
    the dynamic data structure comprising the recognized one or more structured parameters is generated at runtime.

16. The computer-implemented method of claim 10, wherein,
    a subset of the order items from the order comprise a key that identifies the conceptual model, at least a portion of the subset of order items comprise differing arbitrary parameters, and
    the conceptual model defines differing structured parameters for the subset of order items corresponding to the differing arbitrary parameters.

17. A system for recognizing an item of an order, the system comprising:
    a processor communicatively coupled to a non-transitory memory;
    an order item specification definition module in communication with the processor configured to define a generic order item specification comprising a dynamic parameter property;
    an order item reception module in communication with the processor configured to receive an order comprising a plurality of order items, a first of the order items comprising a key and one or more arbitrary parameters, each arbitrary parameter comprising a parameter value;
    a key extraction module in communication with the processor configured to extract the key from the first order item;
    a conceptual model identification module in communication with the processor configured to identify a conceptual model based on the extracted key;
    an order item recognition module in communication with the processor configured to recognize one or more structured parameters that correspond to the one or more arbitrary parameters of the first order item based on the conceptual model; and
    a dynamic data structure module in communication with the processor configured to generate a dynamic data structure comprising the recognized one or more structured parameters by dynamically binding the one or more parameter values from the arbitrary parameters to the dynamic parameter property.

18. The system of claim 17,
    wherein the dynamic data structure module is further configured to extract the one or more parameter values from the arbitrary parameters based on the identified conceptual model; and
    wherein the dynamic data structure module is further configured to generate a specification specific to the first order item by dynamically binding the extracted parameter values from the arbitrary parameters to the structured parameters of the dynamic data structure.

19. The system of claim 18, wherein the dynamic binding module is further configured to execute an expression language query on order data contained within the first order item.

20. The system of claim 19, wherein the expression language query comprises an XQuery query.

21. The system of claim 18, wherein the dynamic data structure further comprises a conceptual model type that defines the structured parameters.

* * * * *